US007757381B2

(12) United States Patent
Kadohira et al.

(10) Patent No.: US 7,757,381 B2
(45) Date of Patent: Jul. 20, 2010

(54) ELECTRIC STAKING DIE

(76) Inventors: Hiroshi Kadohira, 10350-1, Shimoyama, Minobu-cho, Minamikoma-gun, Yamanashi (JP); Takeshi Inagaki, 268-2, Hanakawa-cho, Hamamatsu-shi, Shizuoka (JP); Yuji Mochizuki, 10350-1,Shimoyama, Minobu-cho, Minamikoma-gun, Yamanashi (JP); Koji Natsuhara, 10350-1 Shimoyama, Minobu-cho, Minamikoma-gun, Yamanashi (JP); Shouji Mitsuhira, 23-1 Masugata 1-chrome, Tama-ku, Kawasaki-shi, Kanagawa (JP); Akio Miyamura, Shiga (JP); Mieko Miyamura, legal representative, 103, Ichikomatsui, Oaza, Gamo-cho, Gamo-gun, Shiga (JP); Takao Akiyama, 23-1, Matsugata 1-chrome, Tama-ku, Kawasaki-shi, Kanagawa (JP)

( * ) Notice: Subject to any disclaimer, the term of this patent is extended or adjusted under 35 U.S.C. 154(b) by 1143 days.

(21) Appl. No.: 11/077,381

(22) Filed: Mar. 11, 2005

(65) Prior Publication Data

US 2008/0127703 A1 Jun. 5, 2008

(30) Foreign Application Priority Data

Aug. 16, 2002 (JP) ............................ 2002-237580

(51) Int. Cl.
*B23P 21/00* (2006.01)
*B21D 22/00* (2006.01)

(52) U.S. Cl. .......................................... 29/715; 72/352

(58) Field of Classification Search .................. 29/509, 29/513, 428, 715, 718; 72/352, 57; 56/292; 310/234

See application file for complete search history.

(56) References Cited

U.S. PATENT DOCUMENTS 3,522,462 A * 8/1970 Schwartz .................... 310/234
6,093,277 A * 7/2000 Assink et al. ............... 156/292

* cited by examiner

*Primary Examiner*—John C Hong
(74) *Attorney, Agent, or Firm*—Berenato & White, LLC

(57) ABSTRACT

An electric staking die that joins a joined material to a shaping material, wherein a bump is formed in the shaping material, the bump is inlaid in a hole made in the joined material and the electric staking die presses a shaping portion that is a portion exserting from the joined material as well as a part of the bump, have a recess on a pressing surface that presses said shaping portion of said shaping material wherein an open hole of said recess is larger than said hole made in said joined material, has been offered. The volume of the recess room is more than the volume of the shaping portion of the shaping material. The manufacturing facility comprises a supporting table, the electric staking die and a control means. A method to carry out the electrical staking operation using the electric staking die is presented as sufficient strength staking.

6 Claims, 4 Drawing Sheets

ELECTRIC STAKING DIE

FIELD OF THE INVENTION

This invention relates to an electric staking die and a method for staking operation, especially, to a technology to realize a reliable staking operation.

BACKGROUND OF THE INVENTION

Staking, which is a kind of press forming, has been a well known technology as a mechanical juncture means to join metal materials. “Staking” is a generic word to represent to join more than two members, one of which member is pressed to make shaping for such juncture. For the purpose to obtain enough mechanical strength of the join, it is important that the shaping portion of the shaping material by staking is deformed by staking or pressing within a limit of the plastic deformation of the shaping material and the shaping portion is tightly inlaid in the joined material.

Define of some words used in the description of the present invention are hereby provided. They are “shaping material” as a shaping material by staking, “joined material” as a material which has a open hole to which the shaping portion (as defined as in the following) of the shaping material is inlaid and which is joined with the other material or materials, and “shaping portion” as an exserted bump portion wherein the bump is formed in the shaping material and the rest of the bump is deformed to be inlaid in the open hole.

To deform the shaping portion within the limit of the plastic deformation of the shaping material, the technology called as “electric staking” is well known such that the exserted portion formed in the shaping material is softened by the heat given by the thermo-generation in the electric resistance of the shaping portion through which the electric current flows and the shaping portion is deformed to the shape of the final inlay to fit into the open hole of the joined material by pressing the staking die against the shaping portion.

FIG. 4A, FIG. 4B, FIG. 4C and FIG. 4D show the conventional electric staking process. FIG. 4A is the status of a shaping material, a joined material and a staking die. FIG. 4B shows a deformation process and FIG. 4C shows a post status after a staking has been done in the staking process. FIG. 4D shows a perspective view of the shaping portion 15*c*' of the shaping material 5.

As shown in FIG. 4A, the conventional staking die 1' has a cylindrical form and the pressing surface of the die is flat. Therefore, in the process of the staking especially when the pressing surface of the electric staking die 1' presses the shaping portion 15*b*' simultaneously the electricity is applied to the staking die, a small gap is made between the pressing surface and the shaping portion 15*b*'. An electric discharge 16 tends to be generated in this gap. The corner of the shaping portion is melted by the discharge heating and needle-like thorns 17 are made.

As shown in FIG. 4B, the shaping portion 15*b*' is heated by the electric current in the staking process using the electric staking die 1' therefore is easy to be deformed. However the peripheral part of the shaping portion exposes to the ambient air and the temperature is lower than the center part of the shaping portion through which the much electric current relatively flows, therefore a large temperature slope is made such that the temperature of the peripheral portion is relatively low. While the shaping portion is kept pressed, the peripheral portion is hard to be deformed since the temperature is low and the limit of the plastic deformation is higher than the heated part of the shaping portion. This results in generating cracks in the peripheral area of the shaping portion.

When the needle-like thorns 17 are made on the surface of the shaping portion 15*c*' after staking, the out look is poorly rough and additional works to remove the thorns 17 are needed, which wastes the manufacturing time.

The cracks 18 cause poor outlook as well as joint strength with the joined material becomes week. Moreover, since the cracks cannot be amended, the quality control has been done in a manner such that larger cracks than a standard allowance are regarded as failure staking products and the shaping material and the joined material must be abandoned. Therefore there is a risk of manufacturing problem such as large amount of the product failure due to generating such cracks.

SUMMARY OF THE INVENTION

This invention is to solve the above problems and the object of the invention is to provide an electric staking die technology and an application facility using such electric staking die to realize a sufficient joint strength in the shaping portion after the electrical staking process. The other objective is to offer a sufficient electrical staking operation in use of the electric staking die regarding this invention.

As a means to solve the above objectives, the invention defined in claim 1 provides an electric staking die that presses the shaping portion that is inlaid in the open hole made in the joined material with the electric current flows therethrough, and that has a surface contacting with the shaping portion of the shaping material wherein the contact surface has a recess which covers the surface of the shaping portion therein when the staking die contacts with the shaping portion.

In the case to carry out the staking process by using this electric staking die wherein the electric staking die presses the shaping portion and the electric current flows to the shaping portion, the pressing force against the shaping portion is diverted and a localized deformation is avoided due to the presence of the recess on the pressing surface of the electric staking die that results in preventing to generate cracks in the shaping portion. Moreover, relatively large contacting surface area is obtained therefore the electric discharge between the pressing surface of the staking die can be suppressed. As the result, the formation of needle-like thorns on the surface of the shaping portion can be prevented after the electric staking. The recess described above as “a recess which covers the surface of the shaping portion therein” implies, hereby, that the open hole of the recess is larger than the open hole made in the joined material through which the shaping portion is inlaid.

The invention according to claim 2 features that the recess made on the surface of the electric staking die has a concave shape.

In the case to carry out the staking process by using this type of electric staking die regarding to claim 2 wherein the electric staking die presses the shaping portion and the electric current flows to the shaping portion, the shaping portion can be deformed in a plastic deformation process by the heat generated by the electric current and therefore be easily deformed to smoothly fit into the surface of concave shape of the recess made on the surface of the electric staking die. The pressing force of the electric staking die diverts to the shaping portion through the shape of the concave and therefore the generation of cracks in the shaping portion after staking can be prevented. Even if the axis of the pressing force applied by the electrical staking die is out of the alignment from the axis of the shaping portion, a good staking is possible due to the above effect. The description as “the shape of the concave surface of the electric staking die" implies that the recess surface has a surface caved as like as the inner surface of the concave and the recess surface is smooth surface.

The invention according to claim 3 features that the electric staking die is made of tungsten.

By using this type of electric staking die, a good staking operation after pressing the shaping portion of the shaping material can be carried out with electric current flow into the shaping material through the electric staking die. In addition, the thermal deformation of the staking die can be prevented by using a metal which has high temperature melting point such as tungsten.

The invention according to claim 4 features that the volume of the room of the recess made in the electric staking die is equal to or larger than the volume of the shaping portion which is deformed in the staking.

In the case to carry out the staking process by using this type of electric staking die regarding to claim 4 wherein the electric staking die presses the shaping portion and the electric current flows to the shaping portion, the shaping portion which is deformed in a plastic deformation phenomenon by the heat generated by the electric current is reshaped to fit into the surface of the recess without being pushed out from the room of the recess because the volume of the recess is equal to or more than the volume of the shaping portion. In other words, the shaping portion is kept being held in the room of the recess and deformed in a plastic deformation process. Moreover, the contact surface between the shaping portion and the electric staking die increases in accordance with the progress of the deformation of the shaping portion and finally the shaping portion is homogeneously heated by the electrical contact such that almost surface of the shaping portion contacts to the surface of the recess made in the electric staking die. Since such homogeneous heating facilitates the plastic deformation and the generation of the cracks in the shaping portion can be prevented. In addition, the shaping portion is hard to be exposed to the open air and the outer surface of the shaping portion is kept in heated status due to less cooling down caused by the coverage of the electric staking die over the shaping portion. Therefore the generation of cracks to be made in the shaping portion can be prevented. As described above, it is preferred that the volume of the room of the recess is larger than the volume of the shaping portion.

The invention according to claim 6 is a method featuring that the electrical staking die according to claim 1 is used in the staking operation which consists of at least three steps as; the first one of the steps is to push the electrical staking die to make a contact between the surface of the recess and the shaping portion of the shaping material, the second is to press the electric staking die against the shaping portion simultaneously applying the electric current flowing to the shaping portion through the electric die and the third is to lift off the electric staking die from the shaping portion to be separated.

According to this electrical staking method, that is, the surface of the recess made in the electric staking die contacts to the shaping portion, the surface of the recess presses the shaping portion and applies electricity for current flow generation through the shaping portion and the electric staking die is pulled back in separation from the shaping material, the forming of cracks and needle-like thorns in the shaping portion can be prevented.

The invention according to claim 7 is a method featuring that the electrical staking die according to claim 4 is used in the staking operation which consists of at least four steps as; the first one of the steps is to push the surface of the recess made in the electrical staking die to make a contact with the shaping portion of the shaping material with the electric staking die, the second is to press the electric staking die against the shaping portion with flowing the electric current to the shaping portion through the electric die, the third is to push the electric staking die until the surface in which the recess is made contacts to the joined material and the fourth is to lift off the electric staking die from the shaping portion to be separated.

According to this electrical staking method, that is, the surface of the recess made in the electric staking die contacts to the shaping portion, the surface of the recess presses the shaping portion and applies electricity for current flow generation through the shaping portion, the shaping portion which can be deformed in a plastic deformation process is deformed in such a way that the deformed shaping portion is not pushed out from the room of the recess therefore the deformation is made to fit inside of the room of the recess and the deformed shaping portion is hard to be exposed to the open air. As the result, the shaping portion is pressed in the process of plastic deformation and deformed without the outer surface of the shaping portion being cooled down. By this method, the generation of cracks and needle-like thorns in the shaping portion can be prevented. Moreover, by pushing the electric staking die until the surface in which the recess is made contacts to and firmly presses the joined material against to the shaping material, the joint strength between the shaping material and joined material increases.

PREFERRED EMBODIMENT OF THE INVENTION

Figure 1:
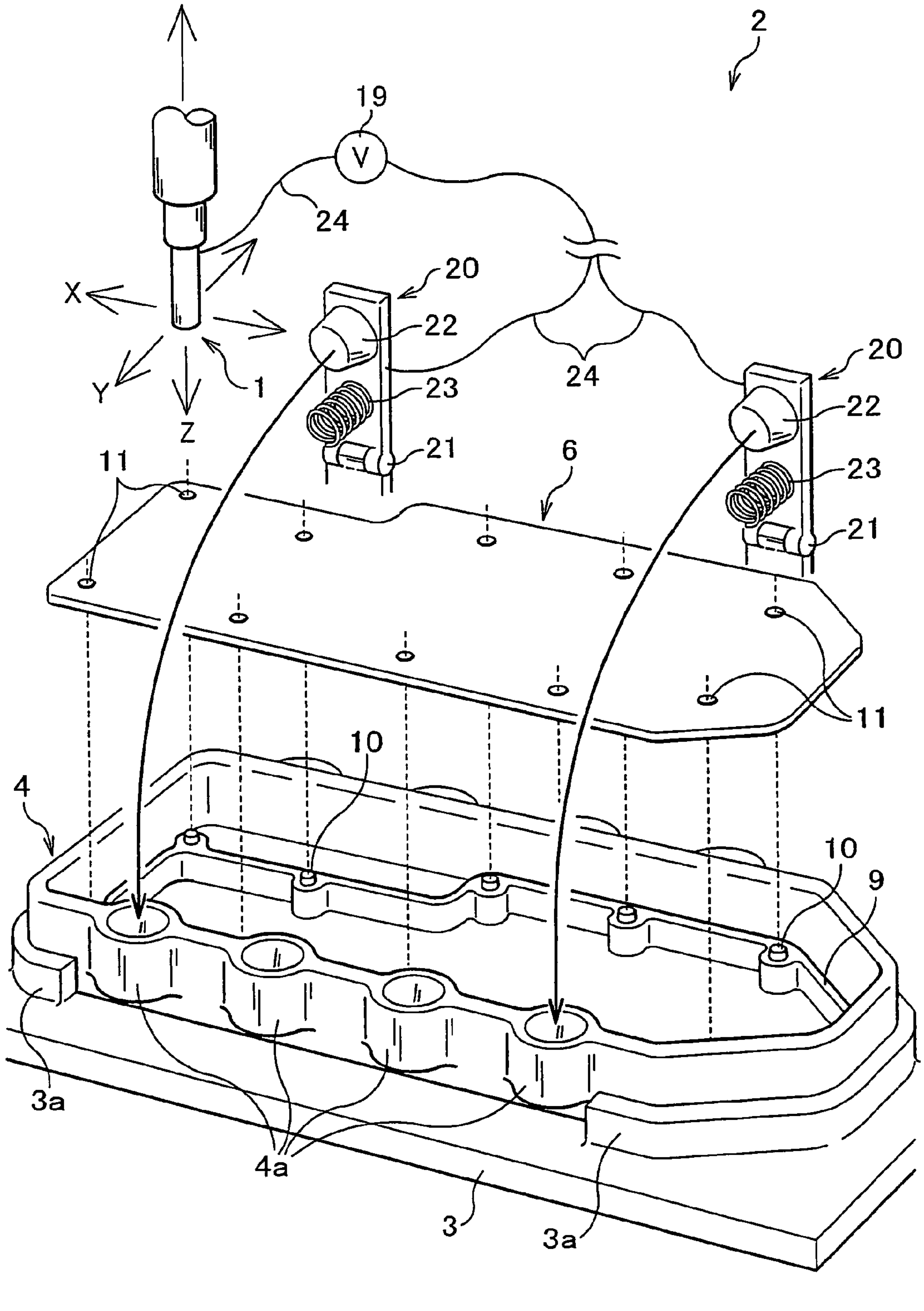
FIG. 1 is a drawing that shows perspective view of a manufacturing facility equipped with the electric staking die regarding to the second embodiment of this invention.

Referring to the drawings, the details of the embodiments of this invention will be explained. In the explanation, the same signs and notations are used for the same composing elements and the overlapped explanations are omitted.

The First Embodiment

The electric staking die and the staking operation method first embodiment will be explained by referring to FIG. 1, FIG. 2 and FIG. 3.

The manufacturing facility 2 that is equipped with the electric staking die 1 regarding to the first embodiment comprises an electric staking die 1 which is controlled by a control means which is not shown in the drawing, a supporting table 3 and an electric power supply terminal 22 formed in a cramp 20 wherein said electric power supply terminal is an exserted bump portion wherein the bump is formed in the cramp 20. This manufacturing facility 2 supports an automobile engine head cover 4 that is a shaping material set on the supporting table. The manufacturing facility 2 works as a fabrication facility wherein the metal plate 6 which is a joined material is joined to the automobile engine head cover 4 which is a shaping material.

The electric staking die 1 is hold by a control means which is not shown in the drawing. The motion of the electric staking die 1 is driven by servo motors in the horizontal directions as X and Y axes and by the compressed air which is under sequential controlling. An embodiment such that the motion of the electric staking die 1 is controlled by a servo system for positioning and by a simple sequential control system for pressing, however the other control method is allowed as by human control is hereby shown.

The electric staking die 1 is connected to an electric power supply 19 through an electric power cable 24. The supporting table 3 (called as a supporting jig) has a supporting guide 3*a* and is made of an electrically non-conductive plastic so that the head cover 4 is hard to be scratched on the paint on the outer surface in the staking operation. The shape of the supporting table 3 is can be modified in compliant to the physical shape of the shaping material to be supported.

The manufacturing facility 2 has two cramps 20 adjacent to the supporting table 3 aligned in a parallel direction. Each cramp has an electric power supply terminal 22 and a spring 23. Moreover, the leading part of the cramp 20 can rotate at the bearing 21 for a rotating motion. Once the head cover 4 is mounted onto the supporting table 3 and the metal plate 6 is set thereon, the motion of the part of the cramp 20 is controlled in bowing such that the electric power supply terminal 22 fits and contacts to the receptacle hole 4*a* simultaneously the spring 23 pushes the surface of the metal plate 6 and a tight contact between the metal plate 6 and the head cover 4 is obtained. The electric power supply terminal 22 implies the electric power supply portion to supply the electric current to the electric staking die 1 and bosses 10 which work as the shaping portion in this embodiment through the head cover 4. The leading part of the cramp 20 and the electric power supply terminal 22 are made of electrical conductive metal as copper alloys. The leading part of the cramp 20 is connected to the electric power supply 19 through the electric power cable 24. In the staking process, a current supply circuit is composed with the electric staking die 1, head cover 4 and the electric power supply terminal 22 and the cramp 20. The electric power supply terminal 22 is formed in the leading part of the cramp 20 in this embodiment, however the cramp 20 which is a mechanical portion of the manufacturing facility 2 and the electric power supply terminal 22 which is an electrical portion of the manufacturing facility 2 can be separately constructed, for example, the whole of the supporting table 3 as an electric power supply terminal can be used.

A plurality of receptacle holes 4*a* is made along a side line of the head cover 4. On the other hand, a rib-like supporting wall 9 is made The rib-like supporting wall 9 and boss 10 are made in a single body mold of a magnesium alloy casting.

The plate 6 is a thin metal plate inlaid in the head cover 4. A plurality of holes 11 is made so that the bosses 10 can be inlaid in the holes.

The Second Embodiment

Figure 2A:
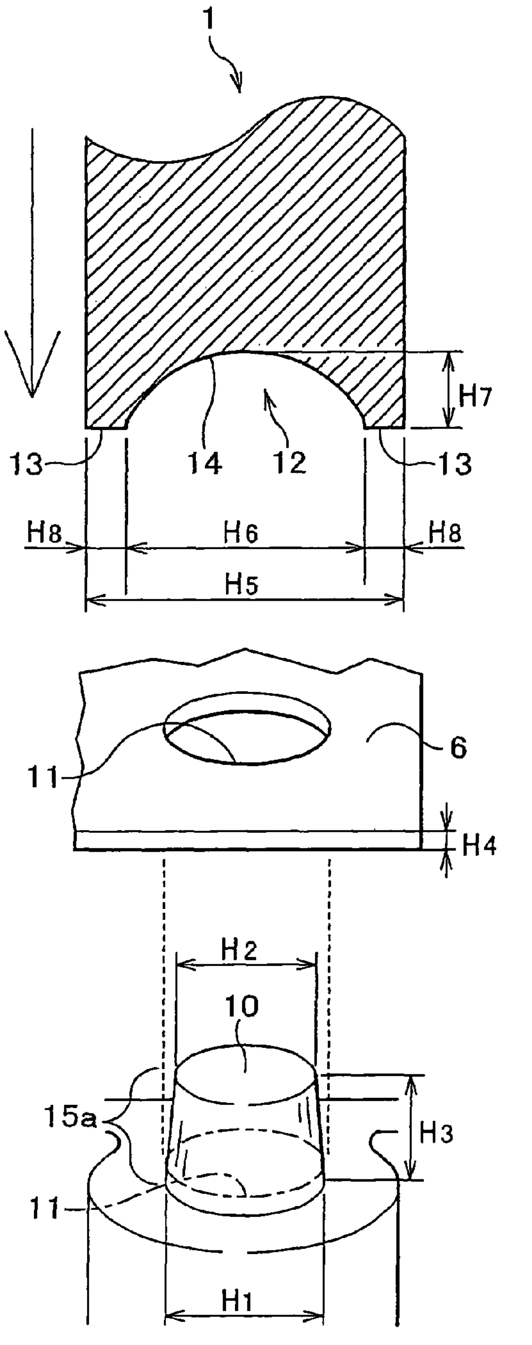
FIG. 2A and FIG. 2B are drawings that show perspective view of the substantial portions regarding to the second embodiment before and after the staking process, respectively.

In referring to FIG. 2A, the electric staking die 1 in relation to the plate 6 and the boss 10 will be explained. The electric staking die 1 has a cylindrical outer shape and a recess 12 at the pressing surface, therefore the pressing surface has a recess surface 14 in the recess 12 and the fringing surface 13 other than the recess 12. Since the electric staking die 1 is made of tungsten, it is hardly possible that the electric staking die is deformed by the heat generated in the electric staking and the shaping portion of the shaping material sticks to the recess surface of the electric staking die. The material is not limited to tungsten for the electric staking die but cupper tungsten alloy or nickel alloy can be used in accordance with the metal of the shaping portion.

In the above embodiment, the outer shape of the electric staking die is cylindrical but the other shapes as rectangular solid, hexagonal column etc. can be selected. The pressing surface and the recess are made normal to the axis of the cylindrical shape of the electric staking die in this embodiment, however, they are made in a tilt angle against the axis of the electrical staking die to press the joined material to the shaping material which has the tilt angle against the axis of the electrical staking die.

The recess 12 of the electric staking die has a semi-spherical shape therefore the contact between the electric staking die and the shaping portion is maintained in a good electrical contact that results in sufficient heating of the shaping portion as well as a good plastic flow and or deformation of the shaping portion in the recess of the electric staking die. From this reason, a good staking operation can be made for the case that the axis of the electric staking die does not coincide with the central axis of the shaping portion as far as the recess is not in-lined axis unless the open hole of the recess 12 made in the electric staking die 1 uncovers the holes 11 of the plate 6. In other words, the diameter of the open hole of the recess is large enough to cover the open hole made in the joined material and the positioning of the electric staking die is controlled so that the open hole of the recess always cover the open hole made in the joined material. In addition, the shape of the recess 12 is not confined in the semi-sphere shape but other ones for example the hexagonal nut shape with round corners to add a mechanical function by deforming the shaping portion 15*c* after electric staking.

The room of the recess 12 of the electric staking die 1 has a larger volume than the volume of an exserted bump portion 15*a* of the boss 10 from the plate 6 before the electric staking is done. Therefore the exserted bump portion 15*a* does not come out from the recess while staking process and it is deformed in a plastic deformation process inside the room of the recess 12.

If a gap between the recess surface 14 and the shaping portion 15*b* exists in the pressing process and the electric discharge is generated therebetween, the shaping portion 15*b* is deformed to meet the recess surface 14 of the recess 12 while staking is being carried out then the discharge stops because the gap disappears. If a needle-like thorn is formed in the shaping portion due to electric discharge, it disappears by being pressing into a shingle block of the shaping portion which is enclosed in the recess 12. Moreover the pressing force against the joined material is more than in the pressing force of the conventional cases because the fringing surface 13 surrounding the recess 12 push the joined material, therefore large joint strength after the electric staking can be obtained.

The boss 10 has a shape of circular trapezoid. The diameter on the surface of the shaping material is smaller than the hole 11 made in the plate 6. It is preferred that the surface of the top of the boss 10 should be curved to fit to the recess surface 14 of the recess 12. Then this curved surface of the boss hardly makes gap with the recess surface 14 of the recess 12 even if the axis of the electric staking die does not coincide with the central axis of the boss 10.

The Third Embodiment

Figure 3A:
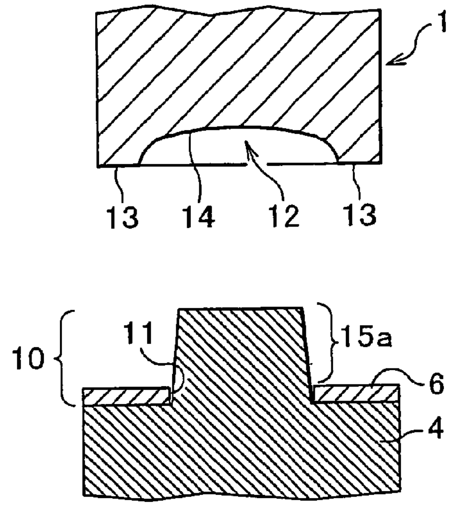
FIG. 3A, FIG. 3B, FIG. 3C, FIG. 3D, FIG. 3E and FIG. 3F are drawings that show a process of staking method wherein the electric staking die regarding to this invention is used.

The staking operation method using the electric staking die regarding to the second embodiment will be explained with referring to FIG. 3. FIG. 3A to FIG. 3F show the process of the electric staking using the electric staking die regarding to the first embodiment. FIG. 3A shows the status of the electrical staking die 1 and the shaping material and the joined material.

Figure 3B:
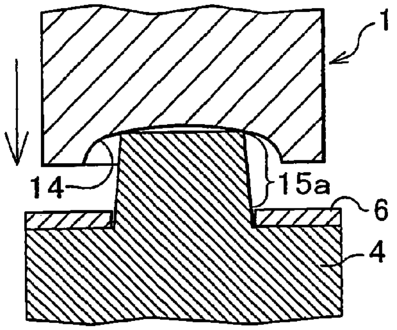

FIG. 3B shows the status that the electric staking die is pushed down by a drive equipment that controls the vertical movement of the electric staking die so that the recess surface 14 contacts with the shaping portion 15*a* after high pressure air is led to the drive equipment to which the electric staking die is mounted. The pressure of the high pressure air led to the drive equipment is limited in the pressure so that the boss 10 made of magnesium alloy is not deformed by the electric staking die in the room temperature. This pressing force against the boss 10 is kept for a certain time because the pressing force applied to the shaping portion 15*a* which is part of the boss 10 for a while can set the contact between the surface of the recess and the shaping portion in a stabilized position and the pressing process can start with a stabilized relation between the electric staking die and the boss. The pressure of the high pressure air is converted into the force to push the shaping portion 15*a* by the electric staking die.

Figure 3C:
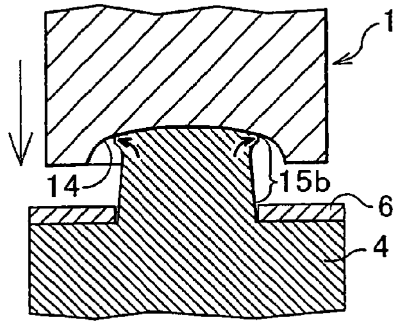

FIG. 3C shows the status when the electric current flows through the electric staking die and the shaping portion. When the electric current starts to flow at the status that the electric staking die 1 presses the shaping portion 15*a*, the boss 10 made of magnesium alloy is heated and the shaping portion becomes to be plastic-deformable then the top edge of the boss 10 starts to deform to fit the curvature of the concave of the recess surface 14.

The word "plastic-deformable" physically implies that the crystal structure of magnesium metal, for the case of magnesium boss of which crystal system is close-packed hexagonal, the slip plane systems relating to the plastic deformation are basal slip $(0001)\langle 11\bar{2}0\rangle$, column slip $\{10\bar{1}0\}\langle 11\bar{2}0\rangle$, cone slip $\{10\bar{1}1\}\langle 11\bar{2}0\rangle$. In the room temperature, the basal slip is only generated however column slip and cone slip which are effective to plastic deformation are generated in the heated condition by the electric current. In addition, it is known that magnesium becomes plastic-deformable caused by column slip and cone slip at more than 300° C.

Figure 3D:
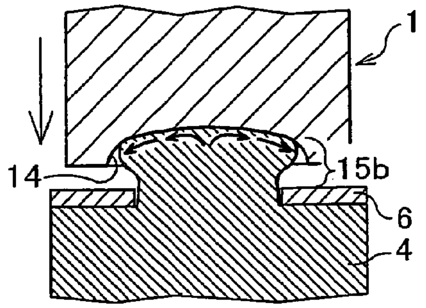

FIG. 3D shows the status of further progress of the electric staking process. By continuously applying the electric current, the shaping portion 15*b* of the boss 10 becomes to be easily deformed in plastic-deformation and deforms along the recess surface 14 of the electric staking die. The electric staking die is controlled by settling the pressure force, electric current flow and the time for current flowing.

Figure 3E:
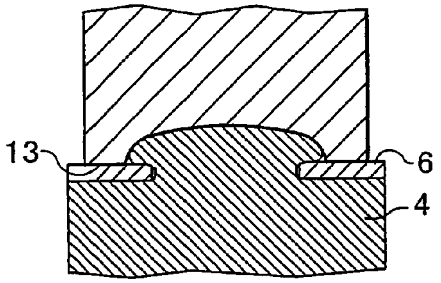

FIG. 3E shows the status of further progress of the fringing surface 13 surrounding the recess 12 made in the electric staking die contacts the plate 6. By pushing the plate 6 by means of the fringing surface 13 of the electric staking die against the head cover 4, the joint strength is further increased. By the tight contact of the fringing surface 13 surrounding the recess 12 to the plate 6, the shaping portion 15*b* is completely sealed off from the open air and is confined in the room of the recess. The electric power is shut while the fringing surface 13 surrounding the recess is pushed to the plate 6. Then the temperature of the shaping portion 15*b* is cooled down and the plastic-deformation of the shaping portion 15*b* is ended.

Figure 3F:
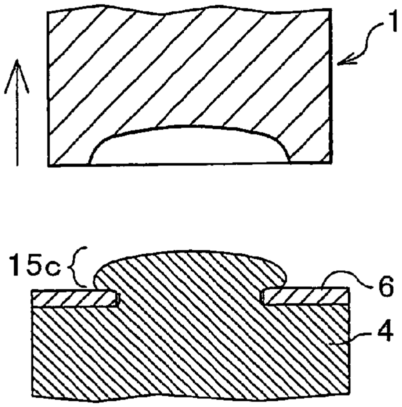
Figure 4A:
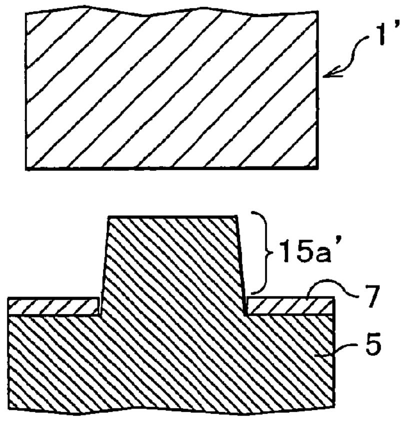
FIG. 4A, FIG. 4B, FIG. 4C and FIG. 4D are drawings that show a conventional electric staking die and a conventional electric staking process.
Figure 4B:
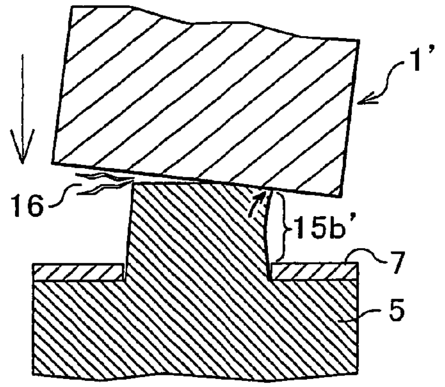
Figure 4C:
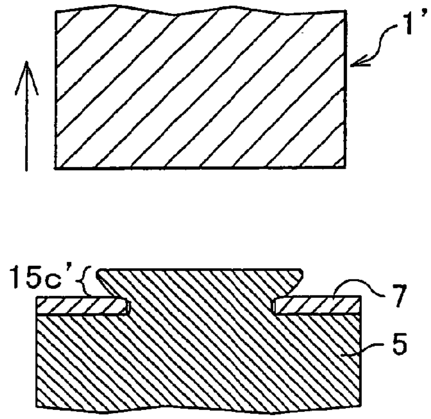
Figure 4D:
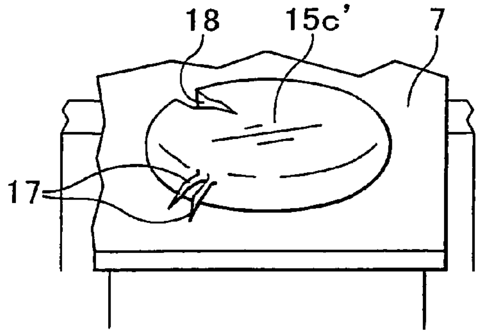

FIG. 3F shows the electric staking die is lifted off from the plate 6 and the shaping portion 15*b*.

Further details of the first embodiment will be explained in referring to FIG. 2A and FIG. 2B.

The electric staking die is made of tungsten and the physical dimensions are as; the diameter H5 is 12 mm, the diameter or the open hole H6 of the recess 12 is 8.5 mm, the depth H7 of the recess is 1.6 mm, the width H8 of the fringing surface is 1.75 mm. The volume of the room of the recess 12 is 90.8 $mm^3$.

The boss 10 is made of magnesium alloy. The physical dimensions are; the bottom diameter H1 of the trapezoidal cone is 6.0 mm, the top diameter H2 of the boss is 5.3 mm, the height H3 is 4.0 mm. The diameter of the hole 11 of the plate 6 is 6.5 mm. Since the thickness H4 of the plate is 0.7 mm, the height H3 of the exserted bump portion from the surface of the plate 6 is 3.3 mm and the volume of the shaping portion is 72.8 $mm^3$. Therefore rate of these two volumes is given as; (the volume of the room of the recess 12 made in the electric staking die): (the shaping portion 15*b* of the boss)=1.25:1.

For these dimensions of the electric staking die and the boss, pressing force of the electric staking die is applied as 5.5 kilo Newtons and the electric current as 5000 ampere at 3 volt.

Figure 2B:
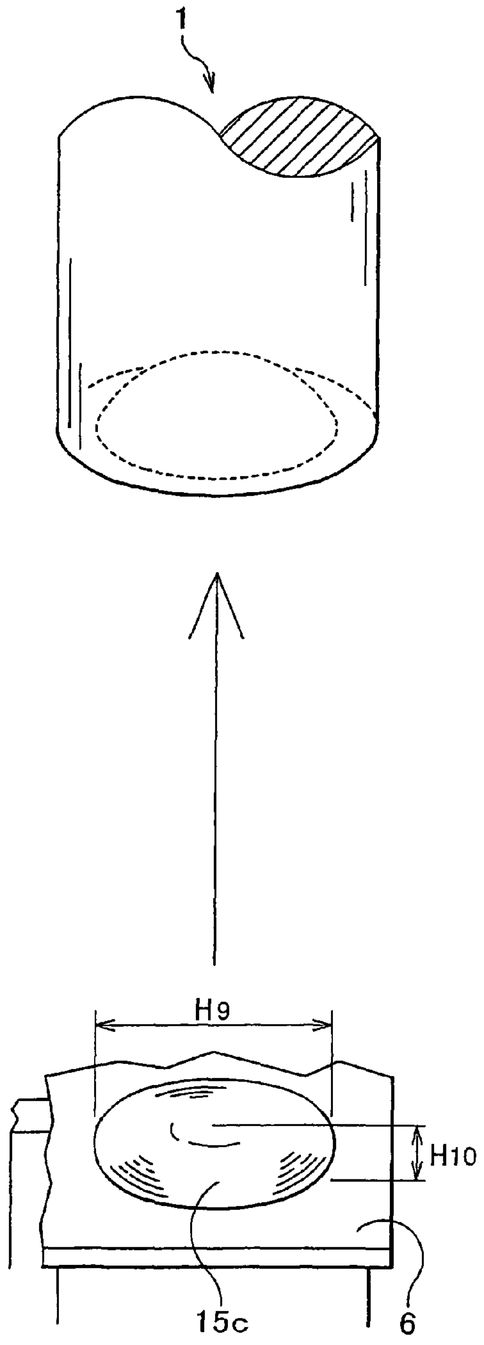

As shown in FIG. 2B, the shaping portion 15*c* can be obtained after the electric staking where no cracks or needle thorns are made. The physical dimensions of the shaping portion 15*c* are; the diameter H9 is 8.45 mm and the height H10 is 1.7 mm.

In the above, a preferred embodiment has been shown, however the other embodiment can be created without deviating the substantial elements of the invention as shown below.

In the above embodiment, electric current is applied to the electric staking die via the cramp 20 that has an electric power supply terminal 22 and staking for a single shaping portion 15*a* of a boss can be carried out by a single electric staking die 1. However another electric staking die 1' can be equipped to the manufacturing facility 2, so that the same electric staking process can be simultaneously done to the electric staking die 1. Then the efficiency of the manufacturing process can increase.

In the above embodiment, the plate 6 which is the joined material is joined with the shaping material by carrying out the electric staking the shaping portion 15*a* of the boss 10 which is molded into a single body head cover 4 which is the shaping material. This electric staking can be applied to another staking wherein a rivet or a tack which is a shaping material is inlaid in the holes of a plurality of joined materials which are piled in an alignment of each hole and the shaping portion which is an exserted portion of the rivet or the tack from the piled joined materials is deformed by the electric staking die to join the joined materials.

In the above embodiment, since the boss 10 is made in the head cover 4 in a single molded body, the shaping portion 15*a* is made of magnesium which is the material of the head cover 4. However, in accordance with the selection of the shaping material, the shaping portion 15*a* can be aluminum, aluminum alloy or zinc alloy and the material of the electric staking die can be selected to realize an appropriate electric staking process in accordance with the selection or the shaping material.

In this invention, a good electric staking die by which a shaping material can be joined with one or a plurality of joined materials without generating cracks or needle-like thorns in the shaping portion of the shaping material is provided. An appropriate electric staking facility using the electric staking die is also provided as well as the electric staking process that realizes a good ES operation for the joined materials.

What is claimed is:

1. An electric staking die for joining a joined material to a shaping material;

said shaping material formed with a bump, said bump being inlaid in a hole made in said joined material so that said electric staking die presses a shaping portion being a portion exserted from said joined material as well as a part of said bump;

said bump formed on said shaping material being softened by heat generated by the electric current flowing through said shaping portion due to an electric resistance thereof;

said electric staking die having a recess surface of which presses said shaping portion of said shaping material, wherein an open hole of said recess is larger than said hole made in said joined material.

2. The electric staking die according to claim 1, wherein a surface of said recess has a concave surface.

3. The electric staking die according to claim 1, wherein said electric staking die is made of tungsten.

4. The electric staking die according to claim 1, wherein a volume of a room of said recess is more than a volume of said shaping portion.

5. A manufacturing facility comprising:

an electric staking die according to claim 1, a supporting table to support said joined material, and a control means to set a position of said electric staking die such that an open hole of said recess covers said hole made in said joined material.

6. The electric staking die according to claim 1, wherein said electric staking die is connected to an electric power supply through an electric power cable to apply an electric current to said electric staking die.

* * * * *

UNITED STATES PATENT AND TRADEMARK OFFICE

CERTIFICATE OF CORRECTION

PATENT NO. : 7,757,381 B2
APPLICATION NO. : 11/077381
DATED : July 20, 2010
INVENTOR(S) : Hiroshi Kadohira et al.

It is certified that error appears in the above-identified patent and that said Letters Patent is hereby corrected as shown below:

Title page, Item (54) Title: should read “ELECTRIC STAKING DIE AND STAKING OPERATION METHOD” rather than “ELECTRIC STAKING DIE”.

Title page, Item (75) Inventors:
Shouji MITSUHIRA’s address should read “...1-chome...” rather than “...1-chrome...”.

Takao AKIYAMA’s address should read “23-1, Masugata 1-chome...” rather than “23-1, Matsugata 1-chrome...”.

Title page, Item (30):
Foreign priority should not be claimed.

Signed and Sealed this
Fifth Day of July, 2011

David J. Kappos
*Director of the United States Patent and Trademark Office*

UNITED STATES PATENT AND TRADEMARK OFFICE
CERTIFICATE OF CORRECTION

PATENT NO. : 7,757,381 B2
APPLICATION NO. : 11/077381
DATED : July 20, 2010
INVENTOR(S) : Hiroshi Kadohira et al.

It is certified that error appears in the above-identified patent and that said Letters Patent is hereby corrected as shown below:

Title page, Item (54) and at Column 1, line 1, Title: should read “ELECTRIC STAKING DIE AND STAKING OPERATION METHOD” rather than “ELECTRIC STAKING DIE”.

Title page, Item (75) Inventors:
Shouji MITSUHIRA’s address should read “...1-chome...” rather than “...1-chrome...”.

Takao AKIYAMA’s address should read “23-1, Masugata 1-chome...” rather than “23-1, Matsugata 1-chrome...”.

Title page, Item (30):
Foreign priority should not be claimed.

This certificate supersedes the Certificate of Correction issued July 5, 2011.

Signed and Sealed this
Sixteenth Day of August, 2011

David J. Kappos
*Director of the United States Patent and Trademark Office*